UNITED STATES PATENT OFFICE.

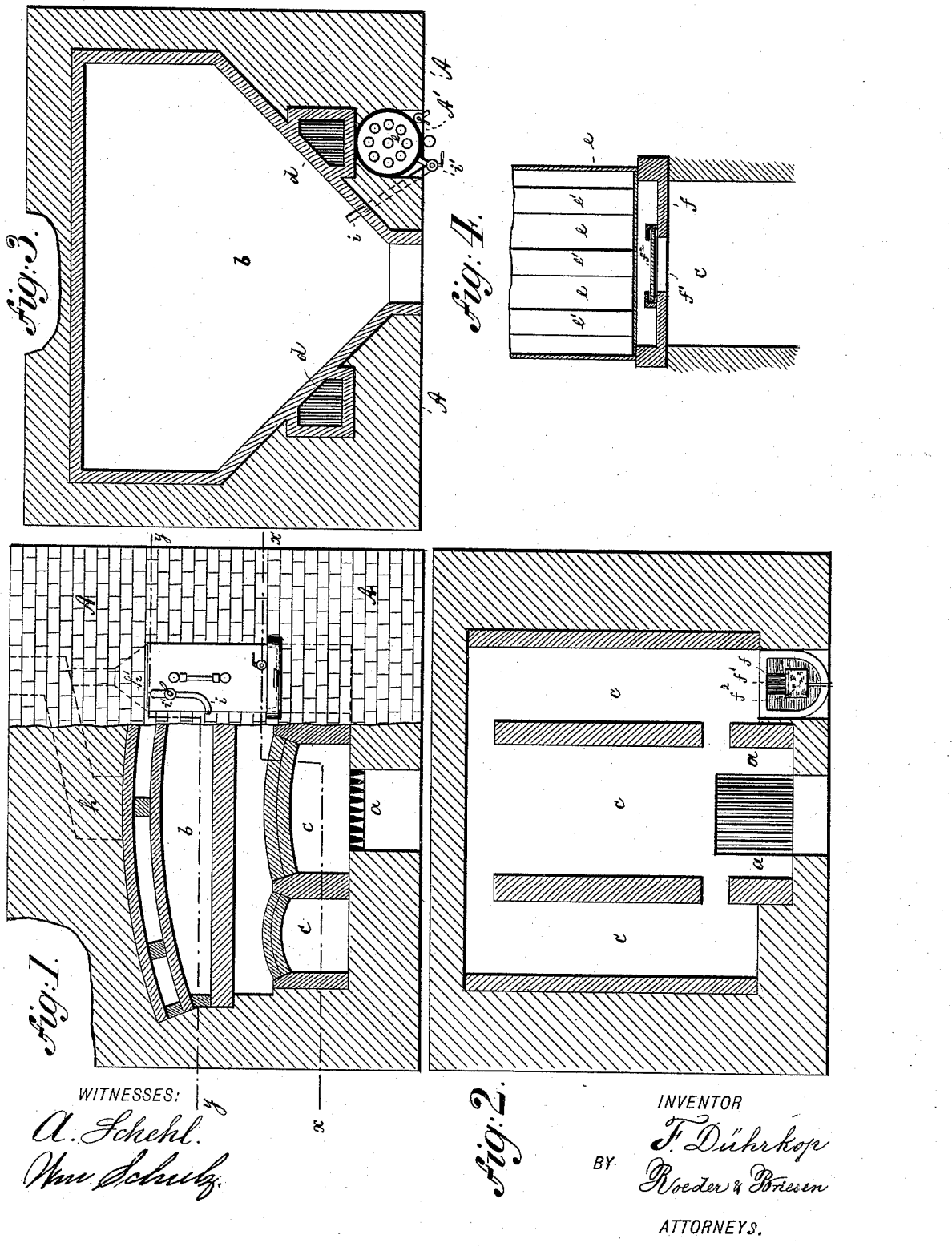

FRITZ DÜHRKOP, OF NEW YORK, N. Y.

BAKER'S OVEN.

SPECIFICATION forming part of Letters Patent No. 492,392, dated February 28, 1893.

Application filed October 31, 1892. Serial No. 450,462. (No model.)

*To all whom it may concern:*

Be it known that I, FRITZ DÜHRKOP, of New York city, New York, have invented an Improved Baker's Oven, of which the following is a specification.

This invention relates to a baker's oven that is provided with a boiler heated by the products of combustion from the fire chamber and emitting steam into the baking chamber for browning the bread.

In consists in the various features of improvement more fully pointed out in the claim.

In the accompanying drawings: Figure 1 is a front elevation partly in section of my improved baker's oven. Fig. 2 is a horizontal section on line $x$, $x$, Fig. 1. Fig. 3 a horizontal section on line $y$, $y$, Fig. 1 and Fig. 4 a detail vertical section through the lower part of the boiler.

The letter $a$, represents the fire chamber of a baker's oven of suitable construction.

$b$, is the baking chamber, $c$, $c$, the horizontal flues and $d$, $d$, the vertical flues. Preferably in close proximity to one of the vertical flues I place within a suitable recess $A'$, of the oven wall $A$, an upright boiler $e$. This boiler is so constructed that the heat from the fire chamber can ascend through or around it, the drawings showing it provided with a number of fire tubes $e'$. The boiler $e$, is supported upon a flanged base plate $f$, provided with an opening $f'$, controlled by a sliding damper $f^2$. The opening $f'$, is located above one of the flues $c$, so that the heat and products of combustion that serve to heat the baking chamber $b$, also in part rise through the boiler to heat the water contained in the latter. After the products of combustion have passed through the boiler $e$, they may be conducted by a hooded branch $h'$, into the chimney $h$.

The steam dome or space of the boiler $e$, communicates by pipe $i$, with the baking chamber $b$. This pipe is provided with the cock $i'$, by which the volume of steam to be ejected into the baking chamber may be controlled.

It will be seen that by my invention I am enabled to emit pure steam into the baking chamber for the purpose of browning the bread and that such steam may be quickly generated without any additional expense or consumption of fuel. The heat rising in the flue $d$, will aid in heating the boiler, if the latter is placed in close proximity thereto.

What I claim is—

The combination in a baker's oven of a fire chamber, a series of communicating flues, a chamber connected with one of the flues, a boiler placed in the chamber, and with a damper between the flue and the chamber, substantially as specified.

F. DÜHRKOP.

Witnesses:
A. JONGHMANS,
F. V. BRIESEN.